United States Patent
Malkes et al.

(10) Patent No.: US 10,629,068 B2
(45) Date of Patent: Apr. 21, 2020

(54) PEDESTRIAN WALKING ROUTES USING A SMART TRAFFIC CONTROL SYSTEM

(71) Applicant: Cubic Corporation, San Diego, CA (US)

(72) Inventors: William A. Malkes, Knoxville, TN (US); William S. Overstreet, Knoxville, TN (US); Jeffery R. Price, Knoxville, TN (US); Michael J. Tourville, Lenoir City, TN (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 16/395,038

(22) Filed: Apr. 25, 2019

(65) Prior Publication Data

US 2019/0333369 A1   Oct. 31, 2019

Related U.S. Application Data

(60) Provisional application No. 62/664,013, filed on Apr. 27, 2018.

(51) Int. Cl.
| | |
|---|---|
| *G08G 1/005* | (2006.01) |
| *H04W 4/02* | (2018.01) |
| *H04W 4/024* | (2018.01) |
| *G01C 21/34* | (2006.01) |

(52) U.S. Cl.
CPC ......... *G08G 1/005* (2013.01); *G01C 21/3484* (2013.01); *H04W 4/024* (2018.02); *H04W 4/027* (2013.01)

(58) Field of Classification Search
None
See application file for complete search history.

(56) References Cited

U.S. PATENT DOCUMENTS

| | | | |
|---|---|---|---|
| 7,197,320 B2 | 3/2007 | Joseph | |
| 7,203,598 B1 | 4/2007 | Whitsell | |
| 7,539,576 B2 | 5/2009 | Ohnishi et al. | |
| 8,040,254 B2 | 10/2011 | Delia et al. | |
| 8,384,562 B2 * | 2/2013 | Wall | G08G 1/095 |
| | | | 340/906 |
| 8,532,843 B2 * | 9/2013 | Nagura | F02N 11/0837 |
| | | | 123/179.4 |
| 10,169,665 B1 * | 1/2019 | Zhang | G06T 7/20 |

(Continued)

*Primary Examiner* — Fekadeselassie Girma
(74) *Attorney, Agent, or Firm* — Kilpatrick Townsend & Stockton, LLP (57) ABSTRACT

The present disclosure is directed to methods and apparatus for providing directions to user devices that belong to pedestrians or to individuals traveling on pedestrian pathways. Pedestrians or other users of user devices wishing to travel along pedestrian pathways toward a destination may be provided instructions according to a criterion, a basic assumption, or a rule. While commonly such criteria may relate to providing individuals with directions to walk from a current location to a specified destination in a minimal time, methods and apparatus consistent with the present disclosure may also allow for a user to specify other rules or criteria that are consistent with one or more objectives or parameters specified by that user. To accomplish this, information may be received from user devices and instructions may be sent to those user devices as users of those user devices progress toward respective destinations.

20 Claims, 9 Drawing Sheets

(56) References Cited

U.S. PATENT DOCUMENTS

| | | | | |
|---|---|---|---|---|
| 10,235,884 B2* | 3/2019 | Song | ............... | H04W 4/029 |
| 10,299,088 B2* | 5/2019 | Uchiyama | ............... | G08G 1/166 |
| 10,416,311 B2* | 9/2019 | Huang | ............... | G01S 19/02 |
| 10,417,714 B1* | 9/2019 | Christensen | ............... | G07C 5/0841 |
| 10,462,608 B1* | 10/2019 | Santarelli | ............... | H04W 4/029 |
| 10,516,976 B2* | 12/2019 | Rivard | ............... | G06Q 10/109 |
| 2006/0074546 A1* | 4/2006 | DeKock | ............... | G08G 1/01 |
| | | | | 701/117 |
| 2013/0326137 A1* | 12/2013 | Bilange | ............... | G06F 12/0866 |
| | | | | 711/113 |
| 2015/0091740 A1* | 4/2015 | Bai | ............... | G08B 21/06 |
| | | | | 340/901 |
| 2015/0142489 A1* | 5/2015 | Block | ............... | H04W 4/029 |
| | | | | 705/7.13 |
| 2016/0153789 A1* | 6/2016 | Gallar | ............... | G01C 21/3635 |
| | | | | 701/408 |
| 2016/0229435 A1* | 8/2016 | Ryan | ............... | B61L 29/24 |
| 2016/0253049 A1* | 9/2016 | Wild | ............... | B60K 35/00 |
| | | | | 715/763 |
| 2017/0113512 A1* | 4/2017 | Park | ............... | B60J 7/057 |
| 2017/0243485 A1* | 8/2017 | Rubin | ............... | G08G 1/052 |
| 2018/0082134 A1* | 3/2018 | Sivaraman | ............... | G08G 1/096766 |
| 2018/0297210 A1* | 10/2018 | Peterson | ............... | B25J 13/006 |
| 2019/0132703 A1* | 5/2019 | Ramasamy | ............... | H04W 4/80 |
| 2019/0301891 A1* | 10/2019 | Rowitch | ............... | G01C 21/32 |

* cited by examiner

PEDESTRIAN WALKING ROUTES USING A SMART TRAFFIC CONTROL SYSTEM

CROSS-REFERENCE TO RELATED APPLICATIONS

The present application claims priority benefit of U.S. provisional patent application 62/664,013 filed Apr. 27, 2018 the disclosure of which is incorporated by reference.

BACKGROUND OF THE INVENTION

1. Field of Invention

The present disclosure is generally related to methods and apparatus that assist pedestrian navigation. More specifically, the present disclosure is directed systems and methods for guiding a pedestrian to effectively reach a destination.

2. Description of the Related Art

Pedestrian crossings or crosswalks are provided to allow pedestrians to cross roads safely. Pedestrian crossings are generally provided as markings on the road's surface, for example white parallel lines extending across a roadway in a direction that is typically perpendicular to a direction that vehicles travel along the roadway. Pedestrian crossings can be commonly seen at road intersections, nearby schools, colleges, other institutions, at places where trails intersect a roadway, or on busy downtown streets of a city. Countdown timers may generally be seen posted at a pedestrian traffic signal. These count-down timers often post a number of seconds remaining for the traffic signal to switch between a green "walk" indication and a red "do not walk" indication. The green walk and red do not walk indications inform pedestrians when it may be safe to walk across a street based on the status of the traffic signal that informs vehicle drivers to stop. Although, pedestrian crossings provide a safer way of crossings roads, they also introduce delay into the journey of a pedestrian. Furthermore, other traffic situations, such as increases in volume of traffic, diversions due to accidents, emergency vehicles, and like may add up to the delay, causing inconvenient time delays to pedestrians. Some pedestrian crossings may not include signal lights, countdown timers, or control systems that may be communicated with to identify traffic conditions in the vicinity of the pedestrian crossing. Because of this, it may be more problematic identifying delays associated with some pedestrian crossings as compared to other pedestrian crossings.

Navigation systems are known in the art for guiding the users to reach a destination. These navigation systems have proved to be effective for vehicle users. However, conventional navigation systems do not typically help pedestrians reach a destination in a minimum amount of time. Thus, there is a need for a pedestrian navigation systems and methods that could direct pedestrians in a manner that allows those pedestrians to reach their destination in a least amount of time.

SUMMARY OF THE PRESENTLY CLAIMED INVENTION

The presently claimed invention relates to a method, a non-transitory computer readable storage medium, or an apparatus executing functions consistent with the present disclosure. A method consistent with the present disclosure may receive information that identifies a destination accessible to pedestrians, identify a starting location, and identify a preferred pedestrian pathway based on a first calculated time delay and a criteria. This criterion may be associated with providing directions to a user device that may be followed by a user of that user device as that user moves along the pedestrian path toward the destination. The present method may also include providing a first portion of the directions to the user device and may include providing a second portion of the directions to the user device via based on an identification that a speed of movement of the user device is consistent with the criteria and the first calculated time delay.

When the method of the presently claimed invention is performed as a non-transitory computer readable storage medium, a processor executing instructions out of the memory may receive information that identifies a destination accessible to pedestrians, identify a starting location, and identify a preferred pedestrian pathway based on a first calculated time delay and a criteria. This criterion may be associated with providing directions to a user device that may be followed by a user of that user device as that user moves along the pedestrian path toward the destination. The present method may also include providing a first portion of the directions to the user device and may include providing a second portion of the directions to the user device via based on an identification that a speed of movement of the user device is consistent with the criteria and the first calculated time delay.

An apparatus consistent with the present disclosure may include a memory and a processor that executes instructions out of the memory when steps consistent with the presently claimed method are performed. As such, the processor may execute instructions out of the memory to receive information that identifies a destination accessible to pedestrians, identify a starting location, and identify a preferred pedestrian pathway based on a first calculated time delay and a criteria. This criterion may be associated with providing directions to a user device that may be followed by a user of that user device as that user moves along the pedestrian path toward the destination. The processor may also execute instructions out of the memory when preparing to provide a first portion of the directions for presentation the user device and when preparing to provide a second portion of the directions to the user device based on an identification that a speed of movement of the user device is consistent with the criteria and the first calculated time delay.

DETAILED DESCRIPTION

The present disclosure is directed to methods and apparatus for providing directions to user devices that belong to pedestrians or to individuals traveling on pedestrian pathways even when those individuals may be riding on a vehicle (e.g. scooter, roller skates/blades, or bicycle) on a pedestrian pathway. Pedestrians or other users of user devices wishing to travel along pedestrian pathways toward a destination may be provided instructions according to a criterion, a basic assumption, or a rule. While commonly such criteria may relate to providing individuals with directions to walk from a current location to a specified destination in a minimal time, methods and apparatus consistent with the present disclosure may also allow for a user to specify other rules or criteria that are consistent with one or more objectives or parameters specified by that user. Methods and apparatus consistent with the present disclosure may allow users to receive updated directions as conditions change as those users proceed along a pedestrian pathway. To accomplish this, information may be received from user devices and instructions may be sent to those user devices as users of those user devices progress toward respective destinations.

Pedestrian navigation systems and methods for guiding a pedestrian to reach a destination in the least possible travel time are also disclosed. The method may include identifying a walking speed of the pedestrian and querying the traffic controller systems for data pertaining to traffic signal timings. The method may then compare estimated pedestrian travel times along different routes when identifying a preferred pathway for the pedestrian to traverse. Apparatus and methods consistent with the present disclosure may also include providing walking directions to the pedestrian via a user device that belongs to that pedestrian.

Figure 1:
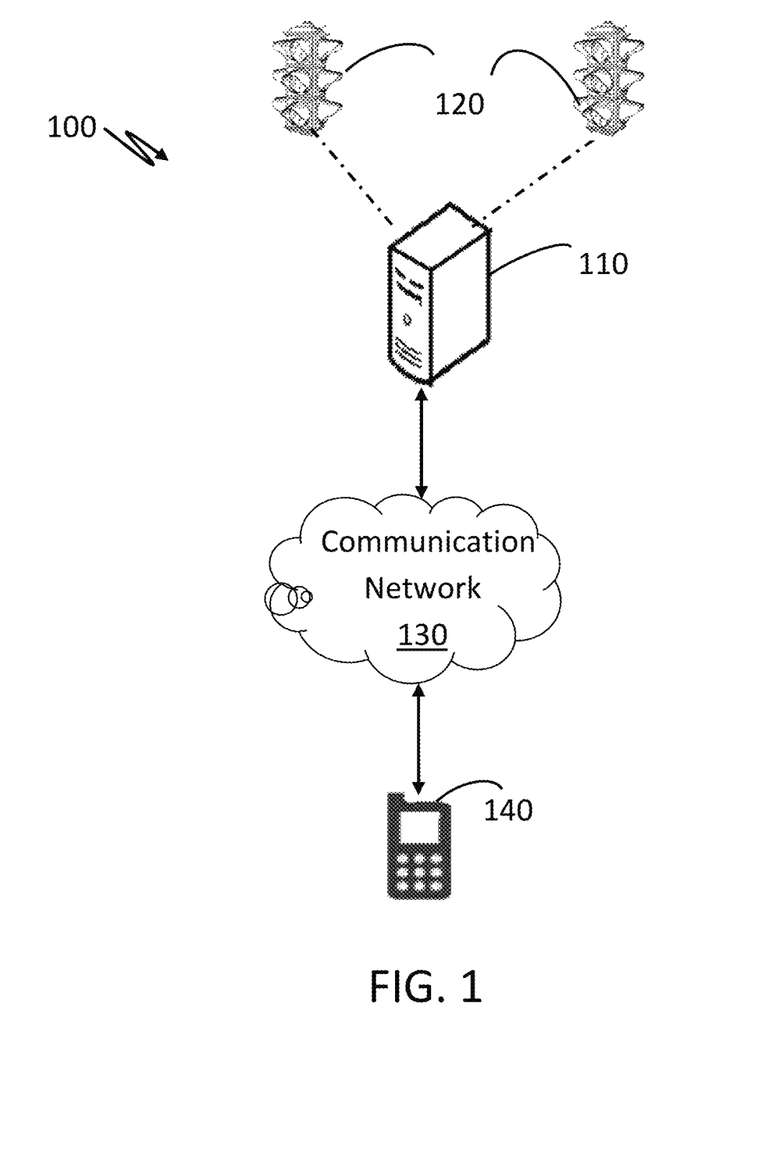
FIG. 1 illustrates a communication network coupled to a computer and to a mobile device.

FIG. 1 illustrates a communication network coupled to a computer and to a mobile device. The system 100 of FIG. 1 includes computer 110, traffic signals 120, communication network 130, and user device 140. Computer 110 may receive information from mobile device 140 and may monitor status information from traffic signals/control system 120 when a user of a user device is walking toward a destination along a path that may include roadway pedestrian crossings associated with traffic signals 120. Computer 110 may be a computer that controls control signals 120 or that monitors patterns associated with traffic signals when forecasting times when a user's walking pace should align with walk indicators associated with traffic signals 120. As such, computer 110 may be a pedestrian navigation system that operates according to one of a number of paradigms.

One exemplary paradigm may require computer (pedestrian navigation system) 110 to communicate with traffic signals 120 or with systems that control traffic signals 120 when providing user device 140 with walking directions. In such an instance, pedestrian navigation system 110 may communicate with traffic control systems 120 to receive traffic signal timing data. In one instance, the pedestrian navigation system 110 may communicate with the traffic control systems 120 installed in a specific area. For example, the traffic controller systems controlling traffic signals installed along all the possible routes for reaching a particular destination. The traffic control systems 120 may be a system that controls the timing of the traffic signals. The traffic signals/control systems 120 may guide movement of both vehicles and pedestrians.

The pedestrian traffic signals 120 may be coupled to a countdown timer indicating times remaining for the signal to turn from a red light indicating a "don't walk" status to a green light indicating a "walk" status. The traffic signals 120 may be pre-scheduled to control the movement of the vehicles and pedestrians. Also, smart traffic control systems 120 may allow dynamic changing of the times of the traffic when traffic conditions or situations change. Such traffic situations may include heavier congestion due to the increased volume of traffic or may relate to delays associated with diversions, construction, emergency vehicle presence, or accidents. The present disclosure encompasses all types of traffic control systems used for controlling movements of the vehicles and pedestrians.

Alternatively, computer 110 may monitory traffic signals 120 over time when forecasting or predicting times when certain signals will change state. As such, computer system 110 may not have to be communicatively coupled with particular traffic signals/control systems 120 to perform methods consistent with the present disclosure. In such instances, computer system 110 may receive video data and identify patterns associated with traffic light switching when forecasting/predicting when particular signals will be in a certain state. Such forecasting systems are examples of a second paradigm that acts as a basis for a pedestrian control system consistent with the present disclosure.

Again, referring to FIG. 1, computer 110 may be communicatively coupled to a pedestrian device 140 through a communication network 130. The communication network 130 may be a wired and/or a wireless network, but preferably a wireless network of any type known in the art. As such, communication network 130 may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, cellular communication networks, 802.11, Bluetooth, or other communication networks known in the art.

In one embodiment, pedestrian computing device 140 may be a portable computing device. The portable computing device 140 may include an interface that receives input from a user. Computing device 140 may include a geographical positioning module to determine a current location of the device. Such geographical positioning module may include a global positioning system (GPS), assisted GPS, or other system that identifies a location of computing device 140 by other means. These other means may include receiving communications associated with one or more beacons that can be used to triangulate the position of computing device 140. Computing device 140 may also include a communication module that establishes a communication connection with a server (or computer 110) that allows computing device 140 to upload or download data from the server or computer 110. In certain instances the server may not be computer 110, yet be a device that provides software applications that may be installed at computing devices 140.

In one instance, computing device 140 may be a smartphone that includes a display screen that receives information, settings, or commands from a user. Furthermore, in such an instance a smartphone may be equipped with other functionalities, such as a microphone to accept audio input from the user or a speaker to broadcast audio information to the user. In other cases, computing device 140 may be a smartwatch or a tablet computer. Application software provided to a particular computing device may be optimized to operate with a type of computing device. Because of this a user interface associated with a smartphone or tablet computer may be optimized as a graphical user interface (GUI) and a user interface associated with a smartwatch may be optimized to rely on audio input.

Navigation information may also or alternatively be received from other sources other than traffic signals or traffic signal controllers 120. For example, navigation information may be received from third parties that collect a stream of data. Conditions relating to an upcoming road intersection may be extracted from this third party data stream and that extracted road intersection information may be evaluated when assigning a projected time delay associated with an upcoming intersection. In an instance when the third party data indicates that the upcoming intersection is experiencing high traffic levels or is likely to incur long delays, a user may be provided with an opportunity to choose a different route. This third party data could include video streams from cameras in the vicinity of a street or an intersection. This may be accomplished by sending communications to a user device associated with the user.

In another example, when a user is walking toward a destination and information related to a particular intersection along their route is not available, a drone (e.g. an unmanned aerial vehicle or another type of automated vehicle) may be launched to survey that particular intersection and to provide that survey information to a navigation computer. Here again when an intersection is experiencing high traffic or is associated with long delays (e.g. greater than a threshold amount of delay) alternate route selections may be provided to the user device.

Figure 2:
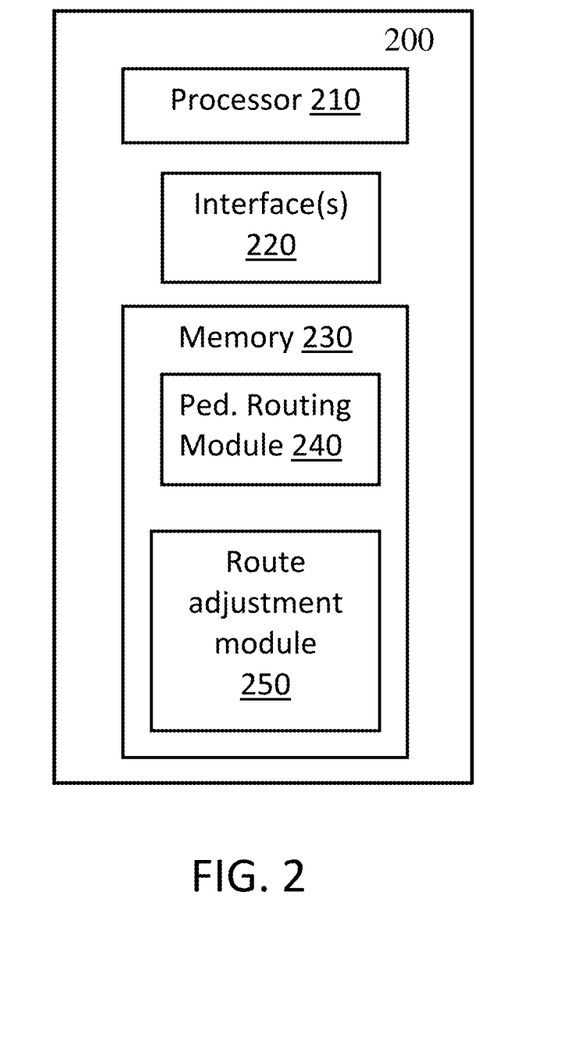
FIG. 2 illustrates components that may be included in a computing device that provides navigation information a pedestrian as that pedestrian walks toward a destination.

FIG. 2 illustrates components that may be included in a computing device that provides navigation information a pedestrian as that pedestrian walks toward a destination. FIG. 2 includes pedestrian navigation system at a user device 200 that includes processor 210, interface(s) 220, and memory 230. Memory 230 may include a pedestrian routing module 240 and a route adjustment module 250.

Processor 210 may execute an algorithm stored in the memory 230 for guiding a pedestrian to reach a destination in a least possible time. Processor 210 may also be configured to decode and execute instructions received from one or more other electronic devices or server(s). The processor 210 may include one or more general-purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor). The processor 210 may be configured to execute one or more computer-readable program instructions, such as program instructions to carry out functions consistent with the present disclosure.

Pedestrian routing module 240 and route adjustment module 250 may be parts of one or more application programs installed at user device 200. Such program applications may have been downloaded from a computer/server at an application store that resides on the Internet. For example, such application programs may have been downloaded from the Apple store.

Interface(s) 220 may help a user interact with a pedestrian navigation system/computer like computer 110 of FIG. 1. The interface(s) 220 of user device 200 may be used to accept an input from a user or provide an output to the user, or both. Interface(s) 220 consistent with the present disclosure, include, yet are not limited to a command line interface (CLI), a graphical user interface (GUI), or a voice/audio interface. Interface(s) 220 may receive identifying information or other information. For example, an interface may receive information that authorizes a location of user device 200 to be transmitted to a navigation computer and that interface may receive information that identifies a location that a user of user device 200 wishes to walk to. User interfaces 220 may also receive one or more preferences from user device 200, for example, a user of a user device may wish to walk to a destination along a path that takes them past a sandwich store and may allow that user to order a sandwich while they walk toward their destination. User preferences may also identify that the user wishes to walk along a scenic route toward their destination. User interfaces 220 may also provide the user with options, such as a selection of a Subway sandwich shop or a sandwich shop that serves Vietnamese sandwiches after which the user may make a selection that is sent to a navigation computer.

Memory 230 may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions. As such memory 230 may include volatile memory, non-volatile memory. Memory 230 may be accessed by a processor when that processor executes instructions when performing methods consistent with the present disclosure.

As discussed above memory 210 may include one or more modules implemented as a software program or application program. In one instance, memory 210 may include the pedestrian routing module 240 and a route adjustment module 250 of FIG. 2. The pedestrian routing module 240 may identify a current location of a pedestrian and determine a destination of the user. Based on such details, a walking speed of the pedestrian may be also be identified or estimated and calculations may be performed that identify an estimated time or arrival (ETA) of the user/pedestrian at a next traffic signal. Further, based on timing details of the next traffic signal and the walking speed of the user/pedestrian, a delay in travel time may be estimated, by the pedestrian routing module 250. This projected delay may be associated with a calculation that identifies that the user/pedestrian will likely arrive at that next signal when that next signal posts a "do not walk" indication. After such a projection has been made, route adjustment module 250 may identify alternate paths for the pedestrian to reach the destination. The route adjustment module 250 may then communicate with traffic control systems, like the traffic signals/control system 120 of FIG. 1 to receive traffic signal timing data associated for an alternate route. Calculations may then be performed to identify a likelihood that the user/pedestrian will arrive at another next signal when that other next signal posts a "walk" indication. Such calculations may also include calculating likely arrival times at numerous signal lights, that identify projections of delay times associated with "do not walk" indications at respective signals, and that identify a route that should result in a minimum amount of walking time for the user/pedestrian to reach their destination. As such, calculations consistent with the present disclosure may be based on a plurality of different projections that may include walking speed, projected arrival times, projected wait times, and other factors when the user/pedestrian walks toward a destination. In such instances, route adjustment module 250 may compare the estimated travel times for the current route and the alternate routes, to identify an alternative route requiring least estimated time to reach the destination. The route adjustment module 250 may guide the pedestrian to follow an alternative route consistent with requiring a least amount of time to traverse.

Figure 3:
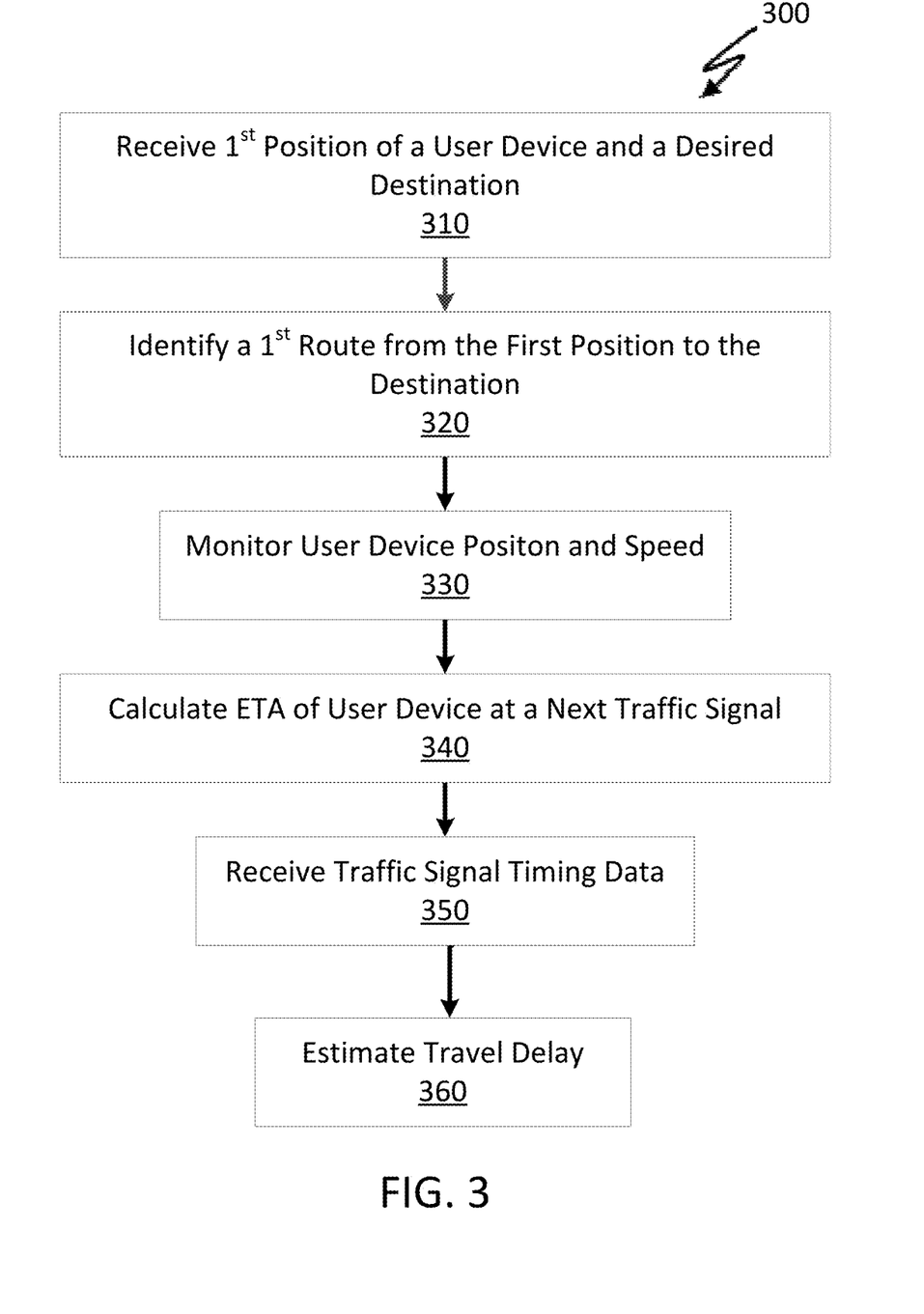
FIG. 3 illustrates exemplary steps that may be used to identify an optimal route for a pedestrian to travel to a destination.

FIG. 3 illustrates exemplary steps that may be used to identify an optimal route for a pedestrian to travel to a destination. The steps illustrated in the flow chart 300 of FIG. 3 may be implemented by a processor of a user device that executes instructions out of a memory after a user installs an application program on their user device. Alternatively the steps illustrated in FIG. 3 may be performed by a navigation control computing system, such as computer 110 of FIG. 1, which communicates with a user device. When a computing system performs the functions of FIG. 3, a user device may access a pedestrian navigation system via a web page opened at the user device.

Step 310 of FIG. 3 may receive a first position of and a desired destination that a user of the user device wishes to walk to with minimal delay. The first position may be identified by a location system (GPS, assisted GPS, or other location system), textual address, or a similar form. The location system may be located at the user device and information from that location system may be used when timings associated with waking to the destination are identified. When the functionality of FIG. 3 is performed at a central navigation computer, the user device may send the first positon information and destination information to the central navigation computer.

After step 310, step 320 may identify a first route that a user of the user device could traverse when traveling to the destination. After the first route has been identified, a map traversing the first route may be displayed in a display at a user device. Next, in step 330, position data associated with the user device may be used to monitor user device position and this position data may be used to identify a waking speed. The walking speed may be identified by a calculation where speed is equal to a change in distance ($\Delta D$) divided by a change in time ($\Delta T$): Speed=($\Delta D/\Delta T$). Here again this calculation may be performed at the user device or may be performed at a navigation system from data provided to it by the user device. This speed data may then be used to calculate an estimated time of arrival (ETA) at a next traffic signal in step 340 of FIG. 3.

After step 340, traffic signal timing data may be received in step 350 of FIG. 3. For example, position routing module like routing module 240 of FIG. 2 may communicate with traffic control systems 120 of FIG. 1 to receive this traffic signal timing data. This received traffic signal data may then be compared with an ETA at the next traffic signal. In certain instances these calculations may identify that the user of the user device will likely have to wait at the traffic signal for 30 seconds for the signal to switch to a state where pedestrian traffic will be allowed cross a street associated with that next traffic signal. This wait time may be calculated in step 360 of FIG. 3 and this wait time may correspond to an amount of travel time delay that may be associated with the user of the user device walking along the first route toward the destination. As mentioned previously, other timings may be estimated based on walking distance, speed, and other estimated delays when identifying how long it should take for the user of the user device to reach the desired destination when walking along the first route.

In instances where estimated delays exceed an expectation of a user, that user may interact with a user interface at their user device to trigger operation of a route adjustment module. This routing adjustment module may be implemented as a software program at a user device or the user device may communicate with a computer that executes program code configured to identify alternate routes that may be traversed by the user of the user device. In certain instances, maximum delays may be specified by a user or a user may specify a targeted arrival time that they wish to arrive at a destination by. For example, when a user needs to walk to the train station to meet a train that leaves at 4:30 pm, that user may specify that they need directions to walk to the train station such that they arrive there by 4:25 pm and directions may be sent to a device that belongs to that user that allows that user to reach the train station in time to board their train.

Figure 4:
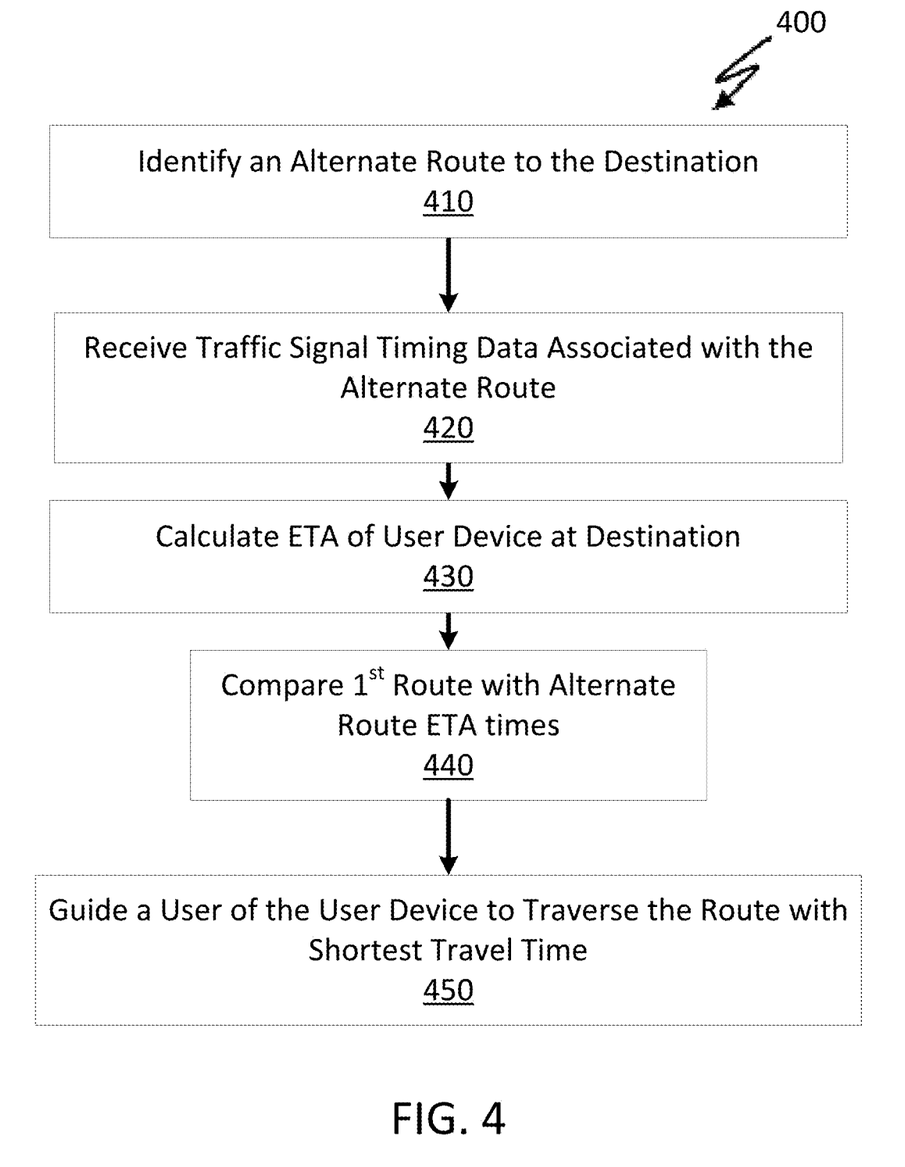
FIG. 4 illustrates steps that may be performed by a software routing module consistent with the present disclosure.

FIG. 4 illustrates steps that may be performed by a software routing module consistent with the present disclosure. Step 410 of the flow chart 400 of FIG. 4 is a step where an alternate route that a user may follow as they walk toward their destination is identified. This alternate route may be identified based on a current position of a user device. Step 410 of FIG. 4 may identify this alternate route after information is received indicating that the user of the user device does not wish to proceed along the first route identified in step 320 of FIG. 3, for example. Next in step 420 traffic signal timing data associated with the alternate route may be received, an estimated arrival time (ETA) for the user reaching the destination may be calculated in step 430, and then estimated arrival times associated with traversing the first route and the alternate route may be compared in step 440 of FIG. 4. Step 440 may also identify which particular route is more likely to provide the user of the user device with a shortest estimated travel time. Finally, in step 450, the user of the user device may be guided along the route associated with the shortest estimated travel time. The steps of FIG. 4 may be performed either by program code executing at a user device or may be performed by a centralized computer that tracks user device movements and user selections.

Figure 5:
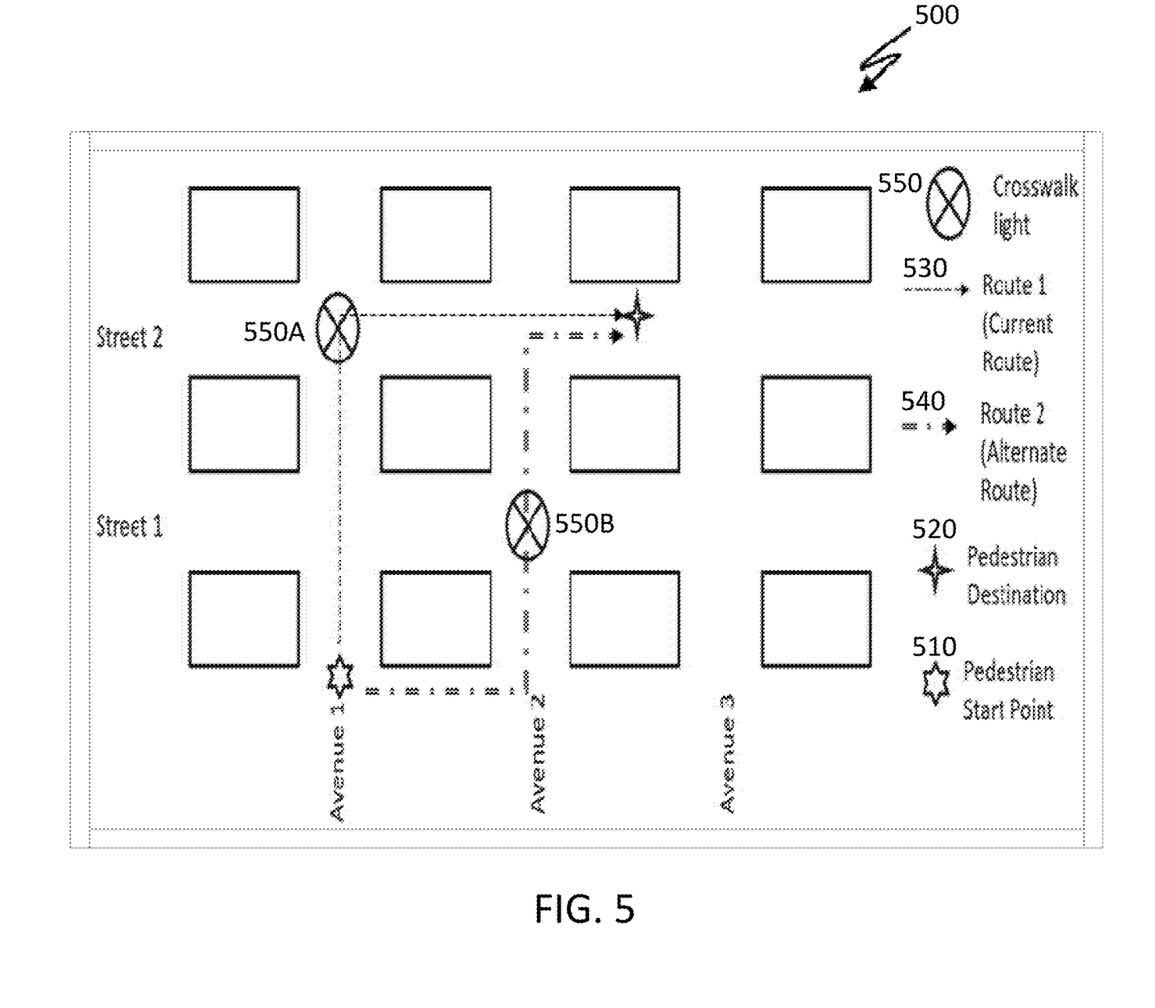
FIG. 5 illustrates an exemplary map that shows a current route and an alternate route that a user may move along toward a destination.

FIG. 5 illustrates an exemplary map that shows a current route and an alternate route that a user may move along toward a destination. FIG. 5 includes a pedestrian start point 510 indicated by a star with 6 points, a pedestrian destination 520 indicated by a star with 4 points, a first route (Route 1) 530, and a alternate route (Route 2) 540 in map 500 of FIG. 5. Note that the first route 530 is identified with a single dashed line and the alternate route 540 is identified with a double dashed line.

The map 500 FIG. 5 also includes various roadways. Two of these roadways (street 1 & street 2) proceed in a horizontal (left-right) direction and three of these roadways (avenue 1, avenue 2, & avenue 3) proceed in a vertical (up-down) direction. FIG. 5 also includes crosswalks 550 identified by a circle with an X in the center of that circle. Note that crosswalk 550A is along the first route 530 and that cross walk 550B is alone the second route 550B.

At any point in time as a user walks toward a destination, that user may interact with a user interface when submitting a request to be provided with another alternate route. For example, in instance when the user is walking alone the first route 530, that user may request to be provided with an alternate route when that user reaches the intersection of street 1 and avenue 1 and a second alternate route may be displayed on a display of a user device belonging to that user. This second alternate route may include waking along street 1 until they reach avenue 2 and then this second alternate route could then proceed along a portion of alternate route 540. Alternatively or additionally, a user device may be provided with route change suggestions by a navigation computer. In such an instance, the navigation computer may send alerts to a user device that informs the user of that device that they may wish to change their walking route based on updated projected delays associated with their present route. The user of that user device may then request updated directions after receiving the alert from the navigation computer.

Figure 6:
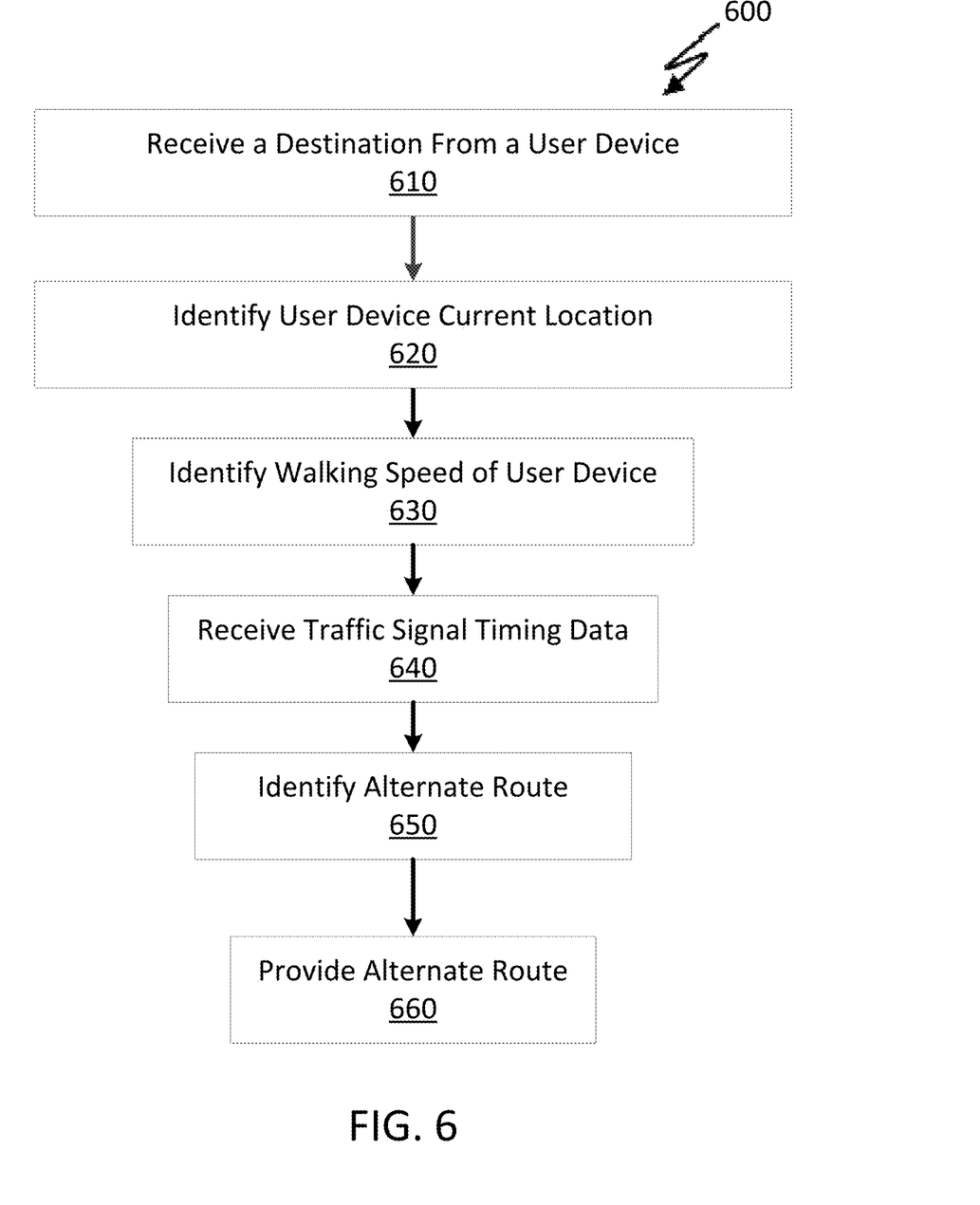
FIG. 6 illustrates steps of a flow chart that may be performed by a pedestrian navigation system consistent with the present disclosure.

FIG. 6 illustrates steps of a flow chart that may be performed by a pedestrian navigation system consistent with the present disclosure. The flow chart 600 of FIG. 6 includes step 610 where a destination may be received from a user device. This destination may have been input via a user interface at the user device and that destination may be sent to a computer configured to provide walking directions to the user device according to a set of criteria, rules, or assumptions. This destination information may be sent to the computer via a communication interface at the user device. Communication interfaces used to send information to or receive information from a pedestrian navigation computer may be any communication interface known in the art, including, yet not limited to a WI-FI 802.11 interface, a cellular network interface, a Bluetooth wireless interface, or a radio communication interface.

After step 610, step 620 may identify a current location of a user device. Here again this location may be identified using GPS information or may be identified by user input (e.g. text or audio input). As the user walks along a route, the movement of a user device of that user may be tracked with identifying a walking speed associated with the user device in step 630. Here again, this walking speed may be identified by a calculation where speed is equal to a change in distance ($\Delta D$) divided by a change in time ($\Delta T$): Speed=$(\Delta D/\Delta T)$. Next in step 640, the navigation computer may receive traffic signal timing data and alternate routes may be identified in step 650 of FIG. 6. At any time, alternate routes may be provided to the user device in step 660 of FIG. 6. The traffic signal timing data received in step 640 may be received continuously from computing devices associated with various different traffic signals. Additionally, other forms of data may be received in step 640. For example, information identifying high volumes of traffic or an accident along a particular route may be used to identify that an alternate route should be provided to the user device. This could allow the user to avoid passing by locations with high traffic volumes or that are associated with an accident, for example.

Methods and apparatus consistent with the present disclosure may also include receiving user preferences. For example, a particular user may wish to avoid areas with larger volumes of traffic because they are walking with small children or because they do not like traffic noise. Is such instances, a user may enter preferences via a user interface. These preferences may be entered as text or by using voice instructions that are interpreted (e.g. by voice recognition software) at a computer that receives these preferences. As such, methods consistent with the present disclosure may not only be based on minimum travel times, yet they may be associated with other preferences that may include a more scenic route, a safer route, a route that passes by certain types of stores, or a route that would cause a user to expend more or less energy.

Figure 7:
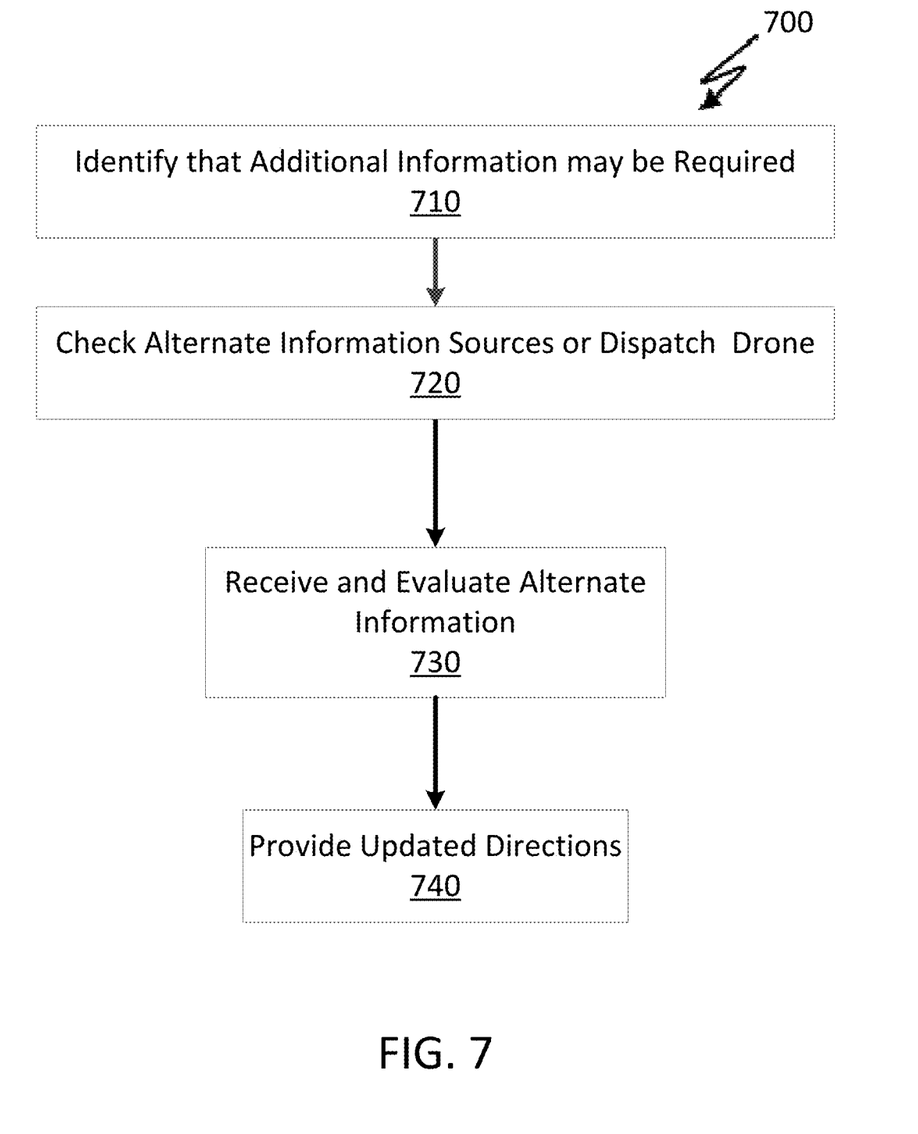
FIG. 7 illustrates steps of a flow chart where information from alternate information sources is received and evaluated when providing directions to a user device.

FIG. 7 illustrates steps of a flow chart where information from alternate information sources is received and evaluated when providing directions to a user device. The flow chart 700 of FIG. 7 begins with step 710 where an identification that additional information may be required may be made. This additional information may relate to traffic conditions at an intersection along a route that are not monitored by a traffic control system. For example, traffic signals at this particular intersection may be older and not be equipped with count-down timers, this intersection may not be equipped with data collection equipment, or this intersection may not include a traffic signal at all. Next in step 720 alternate information sources may be checked for information relating to that particular intersection or a drone may be dispatched to survey the intersection. After step 720 checks alternate information or dispatches a drone, a set of alternate information may be received from an alternate source and that alternate information may be received and evaluated in step 730 of FIG. 7. Such alternate information sources may include, yet are not limited to third party streaming data provider or survey information collected by a drone. Evaluations performed in step 730 may identify that estimated delays associated with the particular intersection are greater than a desired amount of time and updated directions may then be provided to a user device in step 740 of FIG. 7. These updated directions may include a new route that does not traverse that particular intersection because of the excessive projected delay times.

Projections made in step 730 may be based on any number of conditions that may be based data, such as video data, received from an alternate source. This video data may be used to identify that excessive delays could be related to an amount of observed traffic or could be related to the fact that an intersection does not have a street light. Information received from alternate sources may be sourced from emergency response personnel or from an emergency response system that identifies that an emergency may cause excessive delays for individuals traveling along a particular route.

Estimations and projections made by methods and apparatus consistent with the present disclosure may continuously analyse both primary sources of information (e.g. traffic signal light controllers) and from alternate sources (e.g. third party data streams, drone survey data, or emergency response information) for routes that include many intersections and each intersection may be continuously reviewed when identifying updated delay projections. Whenever a particular delay or set of delays exceed a level, an expectation, or a setting set by a user, alternate route information may be offered to a user via their user device dynamically as they proceed to their destination.

Methods and apparatus consistent with the present disclosure may provide walking instructions to a user device that instruct a user of that user device to walk along a route that has a greater walking distance, yet a shorter projected walking time as compared to a route that has the shortest walking distance. In certain instances, a route that has a shortest distance may be associated with a greater total walking time. For example, the shortest route may be blocked by emergency personnel (e.g. police, fire, or ambulance), may be blocked by an event (e.g. parade, bicycle race, or a marathon). A longer distance route associated with a shorter projected walking time may also be identified based on an assumption that avoiding an unprotected street crossing (i.e. a street crossing that does not have a traffic signal) would likely exceed a projected walking time associated with the longer distance route based on an amount of traffic. In such an instance, the shortest distance route may be assigned a longer projected walking time because crossing the unprotected street crossing at a time of high traffic levels will likely case a person to wait a long time for a break in the traffic.

Shorter routes may also incur longer wait times during commute time when traffic signals along certain routes will likely cause a person to wait for a "walk" indication. During commute time, vehicle traffic may be given priority over pedestrian traffic that crosses the path of the vehicle traffic. For example, traffic signal timing may allow vehicle traffic in to proceed for three minutes and that traffic signal timing may only allow for pedestrian traffic to cross a street crossing perpendicular to the vehicle traffic for thirty seconds. In such an instance, an alternate route may cause a person to walk to a longer distance as compared to a shortest distance route when the alternate route proceeds along an overpass that has no wait time. As such, routes with greater distances may be associated with shorter walking times for various reasons.

Alternatively or additionally, methods and systems consistent with the present disclosure may identify and adjust for positioning errors. For example, a pedestrian's user device may provide GPS information that is offset from a true position, and the system may observe that the user device is stopping short of an intersection when a "do not walk" indication is displayed at that intersection. If such offsets are seen as the user device approaches one or more other intersections, an adjustment could be made to the reported position of the user device when the route of the pedestrian is monitored. Inquires could be sent to the user device when such offsets are identified and the user of the user device may confirm that the reported GPS location appears to have an offset from a true position. Other anomalous information that may be observed relating to the movement of a user device may include, observing the user device crossing a street when a "do not walk" indication is displayed at that intersection. Here again, queries may be sent to the user device to identify whether the user of the user device traversed the intersection at the time when the "do not walk" indication was displayed at that intersection. In an instance where the user crossed the intersection when a "walk" indication was displayed, the error could be attributed to an offset in location or time. In instances where anomalous information is identified and attributed to a root cause (such as a location offset), calculations associated with providing instructions to the user may be adjusted to reflect a true estimated position of the user device as the user proceeds along the route. Location information may also be made more precise by using forms of assisted GPS that may use information received from cellular towers or beacons. Calculations may be performed at a user device or at a central navigation system to more precisely identify a location of a user device. As such, errors in identifying a true position can be adjusted using calculations that triangulate a true position based on cell tower or beacon signals.

Figure 8:
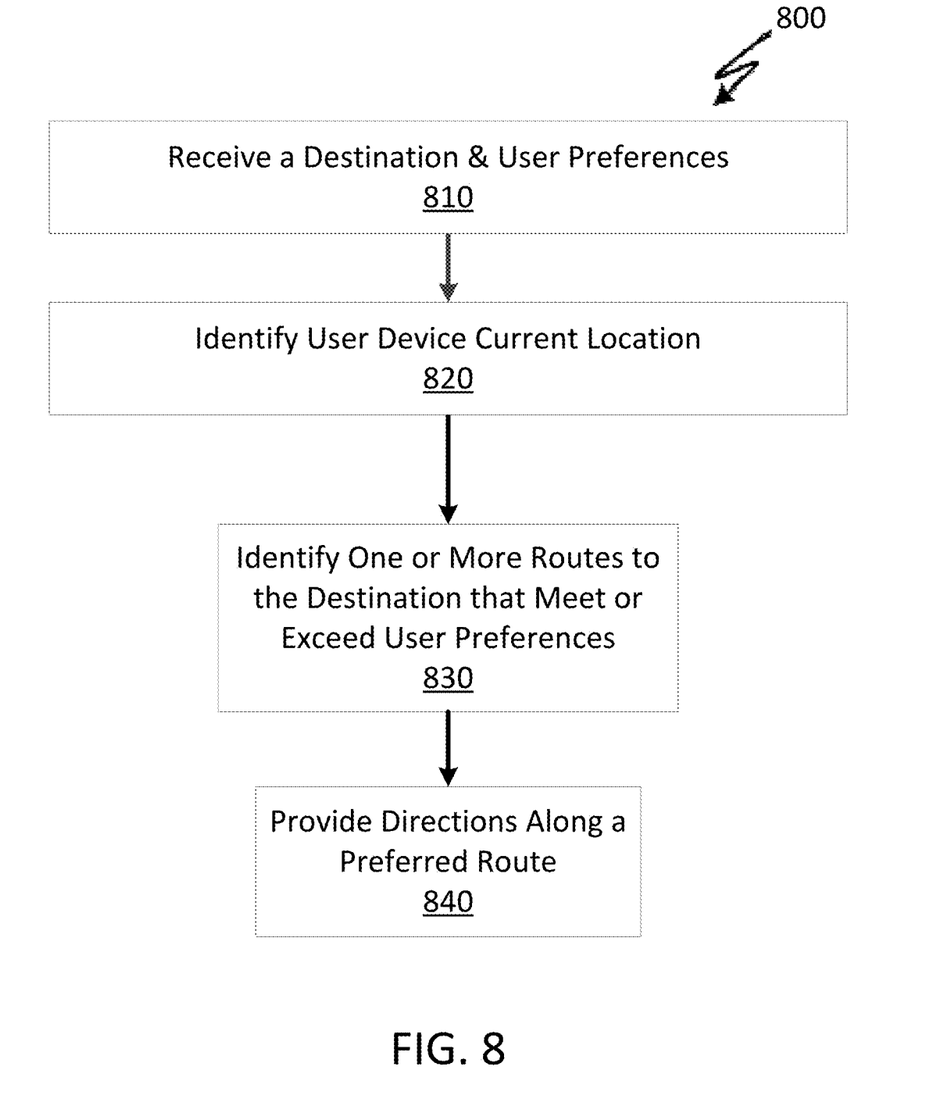
FIG. 8 illustrates steps of a method that identifies routes that may be traversed by a pedestrian according to a set of user provided preferences.

FIG. 8 illustrates steps of a method that identifies routes that may be traversed by a pedestrian according to a set of user provided preferences. Information identifying the destination and the user preferences may be received via a user interface at a user device. The user device could then send this preference information to a navigation computer system, where that information could then be received at the navigation computer in step 810 of flow chart 800 of FIG. 8. Next in step 820 a current location of the user device could be identified from information received from the user device. For example, GPS information received at the user device could be sent to the navigation computer and the navigation computer could identify the location based on this GPS information. Alternatively, a user may provide the location of a starting point by entering text or by speaking into a microphone at the user device. When location information is provided via voice communications, voice recognition hardware, software, or combination thereof could identify the location from audio information received via the microphone.

After the destination, user preferences, and starting or current location have been received one or more routes could be identified in step 830 of FIG. 8. The routes identified may be consistent with the received user preferences. In an example, a user may identify that they wish to walk from the Cal-Train station at Fourth and King Streets in San Francisco along the most scenic route toward a destination after which a user device associated with that user may be provided with a route that proceeds along the Embarcadero in San Francisco.

In another example, the user may identify that they wish to walk from to a destination along a most scenic route that also will help them burn a threshold number of calories. A user device of that user may then be provided with one or more routes that proceed over hills in a city that best meet preferences that were provided by the user. Additionally, such a set of preferences may also provide routes to user devices that meet both a temporal requirement and other criteria. As such, a person that has only 20 minutes to walk to a destination while burning a threshold number of calories could be provided with routes that best been all of their preferences. Alternatively, another user could identify that they wish to walk to a destination via a route that requires a least amount of exertion and a user device associated with this other user may be provided a route that does not include hills.

Criteria for walking to a destination may be associated with preferences relating to total walking time, maximum walking time to meet an objective, shortest walking time, total calories burned, easiest route, or routes designated for handicapped individuals. User preferences may be received and those preferences may be associated with rules that cross-references various different user preferences. For example, a user may provide criterion that indicates that the user is handicapped and cannot proceed along a route that includes a grade/slope (rise distance/run distance) over a threshold amount. In such an instance a user may identify a preference of shortest walking distance that does not exceed a grade of 1.5 feet/1 foot. Here again a route that includes a grade equal or greater than 1.5 feet/1 foot may be avoided based on a rule associated with a user preference or criteria. Alternatively, a user preference may include an average grade that is greater than 2 feet/1 foot. User preferences may be associated with types of stores located along a route or may be associated with a highest scenic metric. In such an instance, scenic metrics/user preferences may be assigned based on a list of best places to visit when in San Francisco. Scenic metrics may also be associated with a self-guided tour that includes walking along a route that includes Pier 39, Fisherman's Warf, Ghirardelli Chocolate, and the crooked part of Lombard Street in San Francisco.

Similarly, walking trails in a park may be associated with both scenic metrics to see within an estimated time budget. In such an instance, a user may identify that they have only 4 hours to traverse a route in Yosemite National Park that includes both a walking and bicycling path that includes various different specific viewpoints. As such, methods and apparatus consistent with the present disclosure may allow a person to plan best ways to see the most scenic views in an allocated amount of time.

After the routes are identified, the navigation computer may communicate information relating to the identified routes and a user may select a preferred route. Alternatively, the navigation computer may select a preferred route for the user. After the preferred route has been identified, directions along the preferred route may be provided to the user device in step 840 of FIG. 8. Here again, as the user device is moved along the route directions provided to the user device may be updated.

Figure 9:
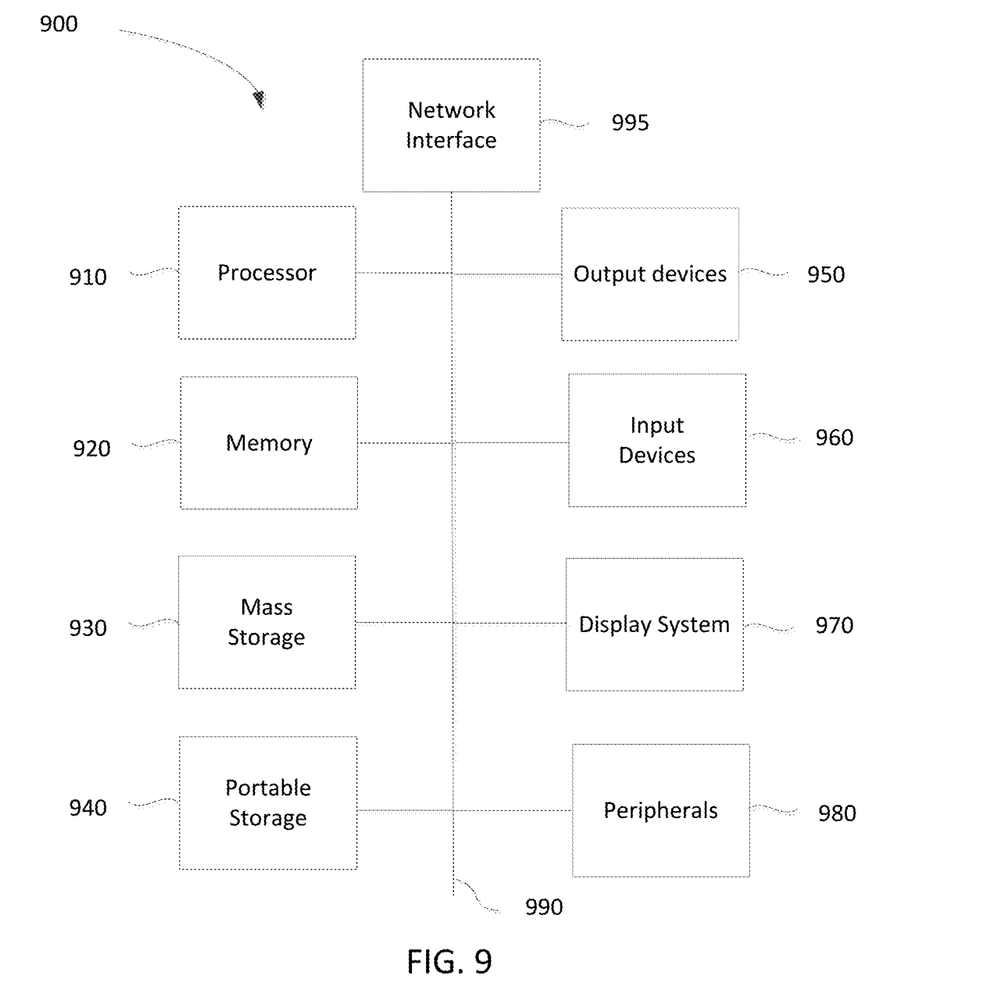
FIG. 9 illustrates a computing system that may be used to implement an embodiment of the present invention.

FIG. 9 illustrates a computing system that may be used to implement an embodiment of the present invention. The computing system 900 of FIG. 9 includes one or more processors 910 and main memory 920. Main memory 920 stores, in part, instructions and data for execution by processor 910. Main memory 920 can store the executable code when in operation. The system 900 of FIG. 9 further includes a mass storage device 930, portable storage medium drive(s) 940, output devices 950, user input devices 960, a graphics display 970, peripheral devices 980, and network interface 995.

The components shown in FIG. 9 are depicted as being connected via a single bus 990. However, the components may be connected through one or more data transport means. For example, processor unit 910 and main memory 920 may be connected via a local microprocessor bus, and the mass storage device 930, peripheral device(s) 980, portable storage device 940, and display system 970 may be connected via one or more input/output (I/O) buses.

Mass storage device 930, which may be implemented with a magnetic disk drive or an optical disk drive, is a non-volatile storage device for storing data and instructions for use by processor unit 910. Mass storage device 930 can store the system software for implementing embodiments of the present invention for purposes of loading that software into main memory 920.

Portable storage device 940 operates in conjunction with a portable non-volatile storage medium, such as a FLASH memory, compact disk or Digital video disc, to input and output data and code to and from the computer system 900 of FIG. 9. The system software for implementing embodiments of the present invention may be stored on such a portable medium and input to the computer system 900 via the portable storage device 940.

Input devices 960 provide a portion of a user interface. Input devices 960 may include an alpha-numeric keypad, such as a keyboard, for inputting alpha-numeric and other information, or a pointing device, such as a mouse, a trackball, stylus, or cursor direction keys. Additionally, the system 900 as shown in FIG. 9 includes output devices 950. Examples of suitable output devices include speakers, printers, network interfaces, and monitors.

Display system 970 may include a liquid crystal display (LCD), a plasma display, an organic light-emitting diode (OLED) display, an electronic ink display, a projector-based display, a holographic display, or another suitable display device. Display system 970 receives textual and graphical information, and processes the information for output to the display device. The display system 970 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 980 may include any type of computer support device to add additional functionality to the computer system. For example, peripheral device(s) 980 may include a modem or a router.

Network interface 995 may include any form of computer interface of a computer, whether that be a wired network or a wireless interface. As such, network interface 995 may be an Ethernet network interface, a BlueTooth™ wireless interface, an 802.11 interface, or a cellular phone interface.

The components contained in the computer system 900 of FIG. 9 are those typically found in computer systems that may be suitable for use with embodiments of the present invention and are intended to represent a broad category of such computer components that are well known in the art. Thus, the computer system 900 of FIG. 9 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 900 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASH EPROM, and any other memory chip or cartridge.

Some embodiments of this disclosure, illustrating all its features. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context dearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.). The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

What is claimed is:

1. A method for providing directions, the method comprising:
   receiving information regarding a destination accessible via one or more pedestrian pathways;
   identifying a starting location associated of a user device traversing the one or more pedestrian pathways toward the destination;
   identifying a preferred one of the one or more pedestrian pathways toward the destination from the starting location, the preferred pathway identified based on a criterion and a first calculated time delay for crossing a first pedestrian street that intersects the preferred pathway;
   providing a portion of an initial set of directions for proceeding along the preferred pathway toward the destination, wherein the portion of the initial set of directions is provided to the user device; and
   identifying that a speed of movement of the user device is consistent with the criterion and the first calculated time delay for crossing the first pedestrian street, wherein a second portion of the initial set of directions is sent to the user device based on the identified speed being consistent with the criterion and the first calculated time delay.

2. The method of claim 1, further comprising:
   performing a calculation that identifies an alternate time delay associated with an alternate route is less than a second time delay associated with the preferred pathway; and
   updating a direction sent to the user device, the updated direction specifying the alternative route based on the alternate time delay being less than the second time delay.

3. The method of claim 1, further comprising:
   receiving the starting location from the user device;
   monitoring the movement of the user device to identify a change in distance and a change in time associated with the movement of the user device; and
   calculating the speed of movement of the user device by dividing the change in distance by the change in time.

4. The method of claim 1, further comprising:
   identifying a first total time delay associated with use of the preferred pathway toward the destination; and
   identifying a second total time delay associated with use of an alternate pathway toward the destination, wherein identifying the preferred pathway is based on the first total time delay being less than the second total time delay.

5. The method of claim 1, wherein the criterion specifies selection of the preferred pathway based on minimizing estimated time delay.

6. The method of claim 1, further comprising:
   receiving signal timing information from a monitoring device associated with the first pedestrian street crossing; and
   identifying a projected arrival time and an estimated time when a walk designation display associated with the received signal timing is forecasted to be displayed at the first pedestrian street crossing, the projected arrival time associated with the speed of movement and the forecasted walk designation associated with the received signal timing.

7. The method of claim 6, further comprising identifying that a time difference in the projected arrival time and the estimated time is less that a threshold amount of time.

8. The method of claim 1, wherein the criterion is based on a user preference.

9. The method of claim 8, further comprising weighting the user preference more than a temporal component associated with the criterion.

10. A non-transitory computer-readable storage medium having embodied therein a program executable by a processor to perform a method for providing directions, the method comprising:
    receiving information regarding a destination accessible via one or more pedestrian pathways;
    identifying a starting location associated of a user device traversing the one or more pedestrian pathways toward the destination;
    identifying a preferred one of the one or more pedestrian pathways toward the destination from the starting location, the preferred pathway identified based on a criterion and a first calculated time delay for crossing a first pedestrian street that intersects the preferred pathway;
    providing a portion of an initial set of directions for proceeding along the preferred pathway toward the destination, wherein the portion of the initial set of directions is provided to the user device; and
    identifying that a speed of movement of the user device is consistent with the criterion and the first calculated time delay for crossing the first pedestrian street, wherein a second portion of the initial set of directions is sent to the user device based on the identified speed being consistent with the criterion and the first calculated time delay.

11. The non-transitory computer-readable storage medium of claim 10, further comprising instructions executable to:
    perform a calculation that identifies an alternate time delay associated with an alternate route is less than a second time delay associated with the preferred pathway; and
    update a direction sent to the user device, the updated direction specifying the alternative route based on the alternate time delay being less than the second time delay.

12. The non-transitory computer-readable storage medium of claim 10, further comprising instructions executable to:
receive the starting location from the user device;
monitor the movement of the user device to identify a change in distance and a change in time associated with the movement of the user device; and
calculate the speed of movement of the user device by dividing the change in distance by the change in time.

13. The non-transitory computer-readable storage medium of claim 10, further comprising instructions executable to:
identify a first total time delay associated with use of the preferred pathway toward the destination; and
identify a second total time delay associated with use of an alternate pathway toward the destination, wherein identifying the preferred pathway is based on the first total time delay being less than the second total time delay.

14. The non-transitory computer-readable storage medium of claim 10, wherein the criterion specifies selection of the preferred pathway based on minimizing estimated time delay.

15. The non-transitory computer-readable storage medium of claim 10, further comprising instructions executable to:
receive signal timing information from a monitoring device associated with the first pedestrian street crossing; and
identify a projected arrival time and an estimated time when a walk designation display associated with the received signal timing is forecasted to be displayed at the first pedestrian street crossing, the projected arrival time associated with the speed of movement and the forecasted walk designation associated with the received signal timing.

16. The non-transitory computer-readable storage medium of claim 15, further comprising instructions executable to identify that a time difference in the projected arrival time and the estimated time is less that a threshold amount of time.

17. The non-transitory computer-readable storage medium of claim 10, wherein the criterion is based on a user preference.

18. The non-transitory computer-readable storage medium of claim 17, further comprising instructions executable to weight the user preference more than a temporal component associated with the criterion.

19. An apparatus for providing directions, the apparatus comprising:
a communication interface that receives information regarding a destination accessible via one or more pedestrian pathways; and
a processor that executes instructions store din memory, wherein execution of the instructions by the processor:
identifies a starting location associated of a user device traversing the one or more pedestrian pathways toward the destination;
identifies a preferred one of the one or more pedestrian pathways toward the destination from the starting location, the preferred pathway identified based on a criterion and a first calculated time delay for crossing a first pedestrian street that intersects the preferred pathway;
provides a portion of an initial set of directions for proceeding along the preferred pathway toward the destination, wherein the portion of the initial set of directions is provided to the user device; and
identifies that a speed of movement of the user device is consistent with the criterion and the first calculated time delay for crossing the first pedestrian street, wherein a second portion of the initial set of directions is sent to the user device based on the identified speed being consistent with the criterion and the first calculated time delay.

20. The apparatus of claim 19, wherein the processor executes further instructions to:
perform a calculation that identifies an alternate time delay associated with an alternate route is less than a second time delay associated with the preferred pathway; and
update a direction sent to the user device, the updated direction specifying the alternative route based on the alternate time delay being less than the second time delay.

* * * * *